(12) United States Patent
Goto

(10) Patent No.: US 11,544,556 B2
(45) Date of Patent: Jan. 3, 2023

(54) LEARNING DEVICE, SIMULATION SYSTEM, LEARNING METHOD, AND STORAGE MEDIUM

(71) Applicant: HONDA MOTOR CO., LTD., Tokyo (JP)

(72) Inventor: Takeru Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 730 days.

(21) Appl. No.: 16/553,309

(22) Filed: Aug. 28, 2019

(65) Prior Publication Data
US 2020/0074302 A1 Mar. 5, 2020

(30) Foreign Application Priority Data

Aug. 30, 2018 (JP) .............................. JP2018-161908

(51) Int. Cl.
*G06N 3/08* (2006.01)
*G05B 13/02* (2006.01)
(Continued)

(52) U.S. Cl.
CPC .............. *G06N 3/08* (2013.01); *G05B 13/027* (2013.01); *G05D 1/0088* (2013.01); *G05D 1/0221* (2013.01); *G05D 2201/0213* (2013.01)

(58) Field of Classification Search
CPC ...... G06N 3/08; G05B 13/027; G05D 1/0088; G05D 1/0221; G05D 2201/0213
See application file for complete search history.

(56) References Cited

U.S. PATENT DOCUMENTS

| 10,019,011 B1* | 7/2018 | Green | G05D 1/0088 |
| 2017/0024643 A1* | 1/2017 | Lillicrap | G06N 3/084 |

(Continued)

FOREIGN PATENT DOCUMENTS

| CN | 103198358 | 7/2013 |
| CN | 106557816 | 4/2017 |

(Continued)

OTHER PUBLICATIONS

Japanese Office Action for Japanese Patent Application No. 2018-161908 dated Nov. 16, 2021.

(Continued)

*Primary Examiner* — Gary Collins
(74) *Attorney, Agent, or Firm* — Amin, Turocy & Watson, LLP

(57) ABSTRACT

A learning device includes a plurality of individual learners. Each of the individual learners includes a planner configured to generate information for defining an operation of the operation subject corresponding to itself, and a reward deriver configured to derive a reward obtained by evaluating information to be evaluated including feedback information obtained from a simulator by inputting information based on the information for defining the operation of the operation subject to the simulator. The planner performs reinforcement learning based on the reward derived by the reward deriver, and at least two of the plurality of individual learners are different in the operations of the operation subject in which the reward derived by the reward deriver is maximized.

5 Claims, 10 Drawing Sheets

(51) Int. Cl.
    *G05D 1/02*     (2020.01)
    *G05D 1/00*     (2006.01)

(56) References Cited

U.S. PATENT DOCUMENTS

2017/0140266 A1* 5/2017 Wang .................. G06N 3/0472
2018/0089563 A1* 3/2018 Redding ................ G06N 3/08

FOREIGN PATENT DOCUMENTS

| JP | 10-254505 | 9/1998 |
|---|---|---|
| JP | 2000-035956 | 2/2000 |
| JP | 2004-116351 | 4/2004 |
| JP | 2005-056185 | 3/2005 |
| JP | 2007-065929 | 3/2007 |
| JP | 2009-181187 | 8/2009 |

OTHER PUBLICATIONS

Chinese Office Action for Chinese Application No. 201910799036.3 dated Jul. 1, 2022.

\* cited by examiner

LEARNING DEVICE, SIMULATION SYSTEM, LEARNING METHOD, AND STORAGE MEDIUM

CROSS-REFERENCE TO RELATED APPLICATION

Priority is claimed on Japanese Patent Application No. 2018-161908, filed Aug. 30, 2018, the content of which is incorporated herein by reference.

BACKGROUND

Field of the Invention

The present invention relates to a learning device, a simulation system, a learning method, and a storage medium.

Description of Related Art

In recent years, in a field of automated driving in which a vehicle autonomously travels, an attempt is made to determine a traveling plan by artificial intelligence (AI) and machine learning. Research and commercialization are also in progress for reinforcement learning that determines an action on the basis of an observation value, calculates a reward based on feedback from an actual environment or a simulator, and optimizes a model parameter. Related to this, a method of generating an operation amount for changing a state of a vehicle by reinforcement learning is disclosed (Japanese Unexamined Patent Application, First Publication No. 2007-65929).

SUMMARY

In reinforcement learning, there is a case in which an environment in which a plurality of operation subjects operate is assumed on a simulator. In the related art, there is a case in which a mechanism for defining operations of each of the plurality of operation subjects has not been sufficiently studied and learning is not able to be performed in a simulation environment close to a real space.

The present invention has been made in consideration of such circumstances, and an object of the present invention is to provide a learning device, a simulation system, a learning method, and a storage medium capable of performing learning in a simulation environment closer to a real space.

The learning device, the learning method, or the storage medium according to the present invention adopts the following constitution.

(1): A learning device according to an aspect of the present invention includes a plurality of individual learners each associated with an operation subject. Each of the individual learners includes a planner configured to generate information for defining an operation of the operation subject corresponding to itself, and a reward deriver configured to derive a reward obtained by evaluating information to be evaluated including feedback information obtained from a simulator by inputting information based on the information for defining the operation of the operation subject to the simulator. The planner performs reinforcement learning based on the reward derived by the reward deriver, and at least two of the plurality of individual learners are different in the operations of the operation subject in which the reward derived by the reward deriver is maximized.

(2): In the aspect of (1) described above, at least two of the plurality of individual learners are different in operation characteristics of the operation subject that becomes a premise that the planner generates the information.

(3): In the aspect of (1) described above, at least two of the plurality of individual learners are different in rules for the reward deriver to evaluate the information to be evaluated.

(4): In the aspect of (1) described above, the operation is movement.

(5): A simulation system according to another aspect of the present invention includes the learning device and the simulator according to the aspect of (1) described above.

(6): A learning method according to another aspect of the present invention causes a computer to function as a plurality of individual learners each associated with an operation subject. Each of the individual learners is configured to generate information for defining an operation of the operation subject corresponding to itself, derive a reward obtained by evaluating information to be evaluated including feedback information obtained from a simulator by inputting information based on the information for defining the operation of the operation subject to the simulator, and perform reinforcement learning based on the derived reward, and at least two of the plurality of individual learners are different in the operations of the operation subject in which the reward is maximized.

(7): A computer-readable non-transitory storage medium according to another aspect of the present invention stores a program that causes a computer to function as a plurality of individual learners each associated with an operation subject. Each of the individual learners is configured to generate information for defining an operation of the operation subject corresponding to itself, derive a reward obtained by evaluating information to be evaluated including feedback information obtained from a simulator by inputting information based on the information for defining the operation of the operation subject to the simulator, and perform reinforcement learning based on the derived reward, and at least two of the plurality of individual learners are different in the operations of the operation subject in which the reward is maximized.

According to the aspects of (1) to (7) described above, learning is able to be performed in a simulation environment closer to a real space.

DESCRIPTION OF EMBODIMENTS

Hereinafter, an embodiment of a learning device, a simulation system, a learning method, and a storage medium of the present invention will be described with reference to the drawings.

[Overview]

Figure 1:
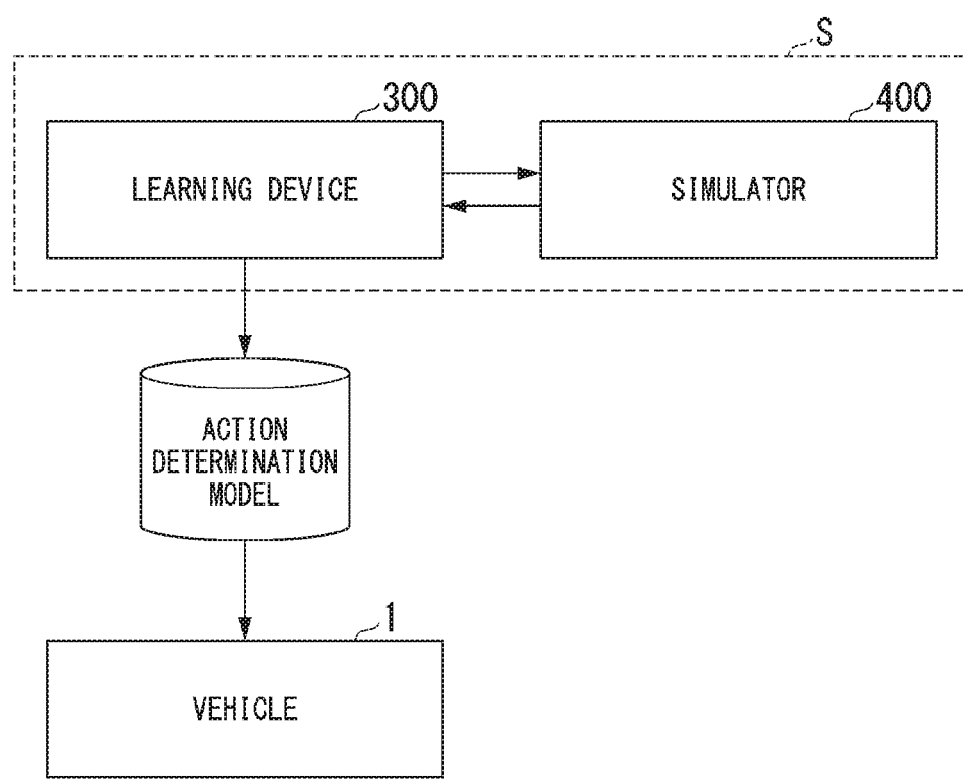
FIG. 1 is a diagram for explaining a role of a learning device.

FIG. 1 is a diagram for explaining a role of a learning device 300. The learning device 300 is realized by one or more processors. The learning device 300 is a device that inputs an action derived by an internal operation to a simulator 400, derives or acquires a reward based on a change in an environment caused thereby, and learns an action (operation) for maximizing the reward. The operation is, for example, movement on a simulation space. An operation other than the movement may be a learning target, but in the following description, it is assumed that the operation means the movement. The simulator 400 shares, with the learning device 300, environment information that is a premise of simulation, such as map information. A learning result of the learning device 300 is mounted on a vehicle 1 as an action determination model. A combination of the learning device 300 and the simulator 400 is a simulation system S.

The action determination model may be a parameter for operating an artificial intelligence (AI) mounted on the vehicle 1, may be a parameter for determining a rule-based action, or may include both of the parameters. The action determination model may be an action determination model group having a plurality of characters, or may be an action determination model having characters selected by a user of the vehicle 1.

The simulator 400 operates a virtual vehicle having the same performance as the vehicle 1 and other traffic participants (an example of an operation person) simultaneously on the simulation environment on the basis of operation information instructed from the learning device 300, and returns feedback information reflecting a position change or the like of the traffic participant to the learning device 300.

[Vehicle]

First, an example of a vehicle 1 of a target on which an action determination model is mounted will be described. The vehicle 1 is an automated driving vehicle (or a driving support function vehicle) that at least partially automatically (without depending on an operation of a driver) controls traveling (running, turning, and stopping).

Figure 2:
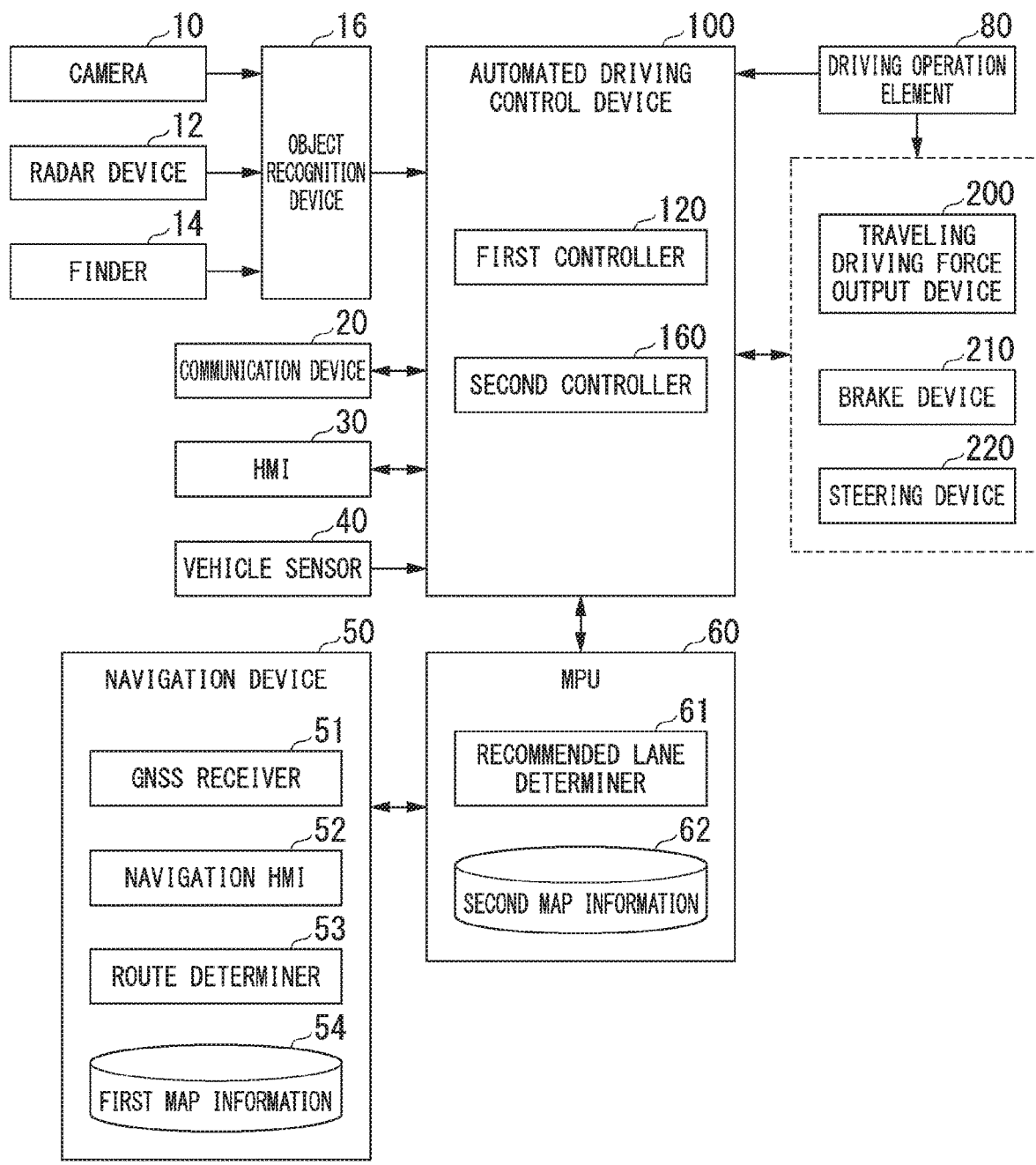
FIG. 2 is a constitution diagram of a vehicle.

FIG. 2 is a constitution diagram of the vehicle 1.

The vehicle 1 is, for example, a vehicle such as a two-wheeled vehicle, a three-wheeled vehicle, or a four-wheeled vehicle, and a driving source of the vehicle 1 is an internal combustion engine such as a diesel engine or a gasoline engine, an electric motor, or a combination thereof. The electric motor operates using electric power generated by a generator connected to the internal combustion engine or electric power discharged by a secondary battery or a fuel cell.

For example, the vehicle 1 includes a camera 10, a radar device 12, a finder 14, an object recognition device 16, a communication device 20, a human machine interface (HMI) 30, a vehicle sensor 40, a navigation device 50, a map positioning unit (MPU) 60, a driving operation element 80, an automated driving control device 100, a traveling driving force output device 200, a brake device 210, and a steering device 220. Such devices and instruments are connected to each other by a multiple communication line such as a controller area network (CAN) communication line, a serial communication line, a wireless communication network, or the like.

For example, the camera 10 is a digital camera using a solid imaging element such as a charge coupled device (CCD) or a complementary metal oxide semiconductor (CMOS). The camera 10 is attached to an arbitrary place of the vehicle 1. The radar device 12 radiates radio waves such as millimeter waves or the like to the surroundings of the vehicle 1 and detects at least the position (distance and direction) of an object by detecting radio waves (reflected waves) reflected by the object. The finder 14 is a light detection and ranging (LIDAR). The finder 14 irradiates light around the vehicle 1 and measures scattered light. The finder 14 detects the distance to the object on the basis of a time from light emission to light reception. For example, the irradiated light is laser light of a pulse shape. The object recognition device 16 performs a sensor fusion process on a detection result by a part or all of the camera 10, the radar device 12, and the finder 14 to recognize a position, a type, a speed, and the like of the object. The object recognition device 16 outputs a recognition result to the automated driving control device 100. The object recognition device 16 may output the detection result of the camera 10, the radar device 12, and the finder 14 as they are to the automated driving control device 100.

For example, the communication device 20 communicates with another vehicle that is present around the vehicle 1 using a cellular network, a Wi-Fi network, Bluetooth (registered trademark), dedicated short range communication (DSRC), or the like, or communicates with various server devices through a wireless base station. The HMI 30 presents various types of information to an occupant of the vehicle 1 and receives an input operation by the occupant. The HMI 30 includes various display devices, speakers, buzzers, touch panels, switches, keys, and the like. The vehicle sensor 40 includes a vehicle speed sensor that detects a speed of the vehicle 1, an acceleration sensor that detects an acceleration, a yaw rate sensor that detects an angular velocity around a vertical axis, a direction sensor that detects a direction of the vehicle 1, and the like.

For example, the navigation device 50 includes a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies the position of the vehicle 1 on the basis of a signal received from a GNSS satellite. The position of the vehicle 1 may be specified or supplemented by an inertial navigation system (INS) using an output of the vehicle sensor 40. The navigation HMI 52 includes a display device, a speaker, a touch panel, a key, and the like. For example, the route determiner 53 determines a route (hereinafter referred to as a route on a map) from the position of the vehicle 1 specified by the GNSS receiver 51 (or an input arbitrary position) to a destination input by the occupant using the navigation HMI 52 by referring to the first map information 54. For example, the first map information 54 is information in which a road shape is expressed by a link indicating a road and nodes connected by the link. The route on the map is output to the MPU 60. For example, the navigation device 50 may be realized by a function of a terminal device such as a smartphone or a tablet terminal possessed by the occupant. The navigation device 50 may transmit a current position and a destination to a navigation server through the communication device 20 and acquire the same route as the route on the map from the navigation server.

For example, the MPU 60 includes a recommended lane determiner 61 and holds second map information 62 in the storage device such as an HDD or a flash memory. The second map information 62 is map information with an accuracy higher than that of the first map information 54. The recommended lane determiner 61 divides the route on the map provided from the navigation device 50 into a plurality of blocks (for example, divides the route into intervals of 100 [m] in a vehicle progress direction), and determines a recommended lane for each block by referring to the second map information 62. The recommended lane determiner 61 determines the lane numbered from the left that the vehicle travels in. In a case in which a branching position is present in the route on the map, the recommended lane determiner 61 determines the recommended lane so that the vehicle 1 is able to travel on a reasonable travel route for progressing to a branch destination.

The driving operation element 80 includes, for example, an acceleration pedal, a brake pedal, a shift lever, a steering wheel, a modified steering wheel, a joystick, and other operation elements. A sensor that detects an operation amount or presence or absence of an operation is attached to the driving operation element 80, and a detection result of the sensor is output to some or all of the automated driving control device 100, or the traveling driving force output device 200, the brake device 210, and the steering device 220.

Figure 3:
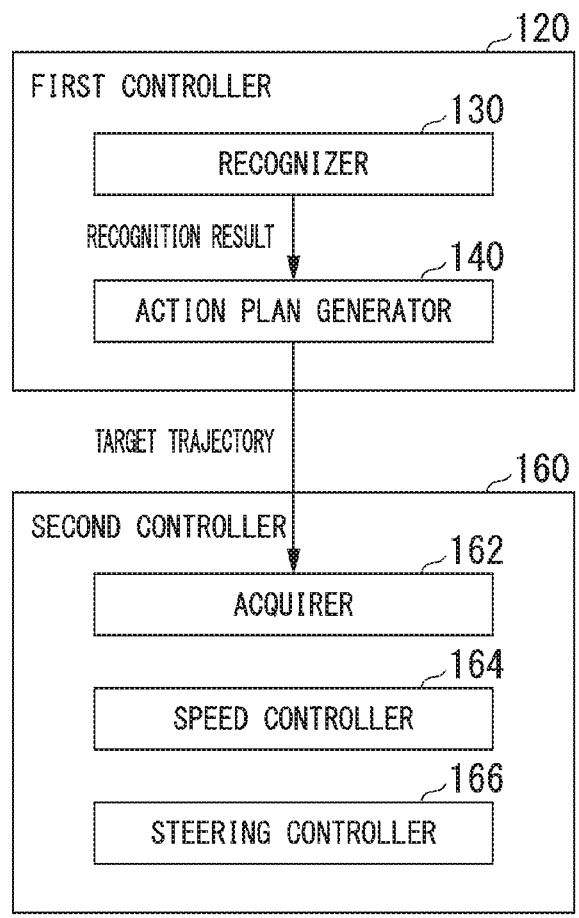
FIG. 3 is a functional constitution diagram of a first controller and a second controller.

For example, the automated driving control device 100 includes a first controller 120 and a second controller 160. FIG. 3 is a functional constitution diagram of the first controller 120 and the second controller 160. For example, the first controller 120 includes a recognizer 130 and an action plan generator 140. For example, the first controller 120 realizes a function by AI and a function of a previously given rule-based model in parallel. For example, a function of "recognizing an intersection" may be realized by executing recognition of an intersection by deep learning or the like and recognition on the basis of a previously given condition (there is a pattern matching signal, a road sign, or the like) in parallel, giving scores to both sides, and comprehensively evaluating the scores. Therefore, reliability of automated driving is guaranteed.

The recognizer 130 recognizes states such as the position, the speed and the acceleration of the object around the vehicle 1, on the basis of information input from the camera 10, the radar device 12, and the finder 14 through the object recognition device 16.

For example, the recognizer 130 recognizes a lane (traveling lane) on which the vehicle 1 is traveling. For example, the recognizer 130 recognizes the traveling lane by comparing a pattern of a road division line (for example, an arrangement of a solid line and a broken line) obtained from the second map information 62 with a pattern of a road division line around the vehicle 1 recognized from the image captured by the camera 10. When recognizing the traveling lane, the recognizer 130 recognizes the position and a posture of the vehicle 1 with respect to the traveling lane. For example, the recognizer 130 may recognize a deviation of a reference point of the vehicle 1 from a center of the lane and an angle formed by a line connecting the center of the lane of a progress direction of the vehicle 1 as a relative position and the posture of the vehicle 1 with respect to the traveling lane.

The action plan generator 140 generates a target trajectory along which the vehicle 1 automatically (without depending on the operation of the driver) travels in the future so that the vehicle 1 travels on the recommended lane determined by the recommended lane determiner 61 in principle and furthermore the vehicle 1 is able to cope with the surrounding situation of the vehicle 1. The target trajectory includes, for example, a speed element. For example, the target trajectory is expressed as a sequence of points (trajectory points) where the vehicle 1 reaches. The trajectory point is a point where the vehicle 1 reaches for each predetermined traveling distance (for example, about several [m]) at a road distance, and separately from that, a target speed and a target acceleration for each predetermined sampling time (for example, about 0.X [sec]) are generated as part of the target trajectory. The trajectory point may be a position where the vehicle 1 reaches at a sampling time for each predetermined sampling time. In this case, information on the target speed and the target acceleration is expressed by an interval between the trajectory points.

In generating the target trajectory, the action plan generator 140 may set an event of the automated driving. The event of the automated driving includes a constant speed traveling event, a low speed following traveling event, a lane change event, an intersection passing event, a branch event, a merge event, a takeover event, and the like. The action plan generator 140 generates a target trajectory according to an activated event.

The second controller 160 controls the traveling driving force output device 200, the brake device 210, and the steering device 220 so that the vehicle 1 passes through the target trajectory generated by the action plan generator 140 at a scheduled time.

For example, the second controller 160 includes an acquirer 162, a speed controller 164, and a steering controller 166. The acquirer 162 acquires information on the target trajectory (a trajectory point) generated by the action plan generator 140 and stores the information in a memory (not shown). The speed controller 164 controls the traveling driving force output device 200 or the brake device 210 on the basis of a speed element accompanying the target trajectory stored in the memory. The steering controller 166 controls the steering device 220 according to a degree of curvature of the target trajectory stored in the memory. For example, a process of the speed controller 164 and the steering controller 166 is realized by a combination of a feed-forward control and a feedback control. As an example, the steering controller 166 is executed by a combination of a feed-forward control according to a curvature of the road ahead of the vehicle 1 and a feedback control on the basis of the deviation from the target trajectory.

The traveling driving force output device 200 outputs, to driving wheels, a traveling driving force (torque) for enabling the vehicle to travel. For example, the traveling driving force output device 200 includes a combination of an internal combustion engine, an electric motor, a transmission, and the like, and an ECU that controls the internal combustion engine, the electric motor, the transmission, and the like. The ECU controls the above-described constitutions according to the information input from the second controller 160 or the information input from the driving operation element 80.

For example, the brake device 210 includes a brake caliper, a cylinder that transfers oil pressure to the brake caliper, an electric motor that generates the oil pressure in the cylinder, and a brake ECU. The brake ECU controls the electric motor according to the information input from the second controller 160 or the information input from the driving operation element 80, so that a brake torque according to a control operation is output to each wheel.

For example, the steering device 220 includes a steering ECU and an electric motor. For example, the electric motor changes a direction of steerable wheels by applying a force to a rack and pinion mechanism. The steering ECU changes the direction of the steerable wheels by driving the electric motor according to the information input from the second controller 160 or the information input from the driving operation element 80.

[Learning Device]

Figure 4:
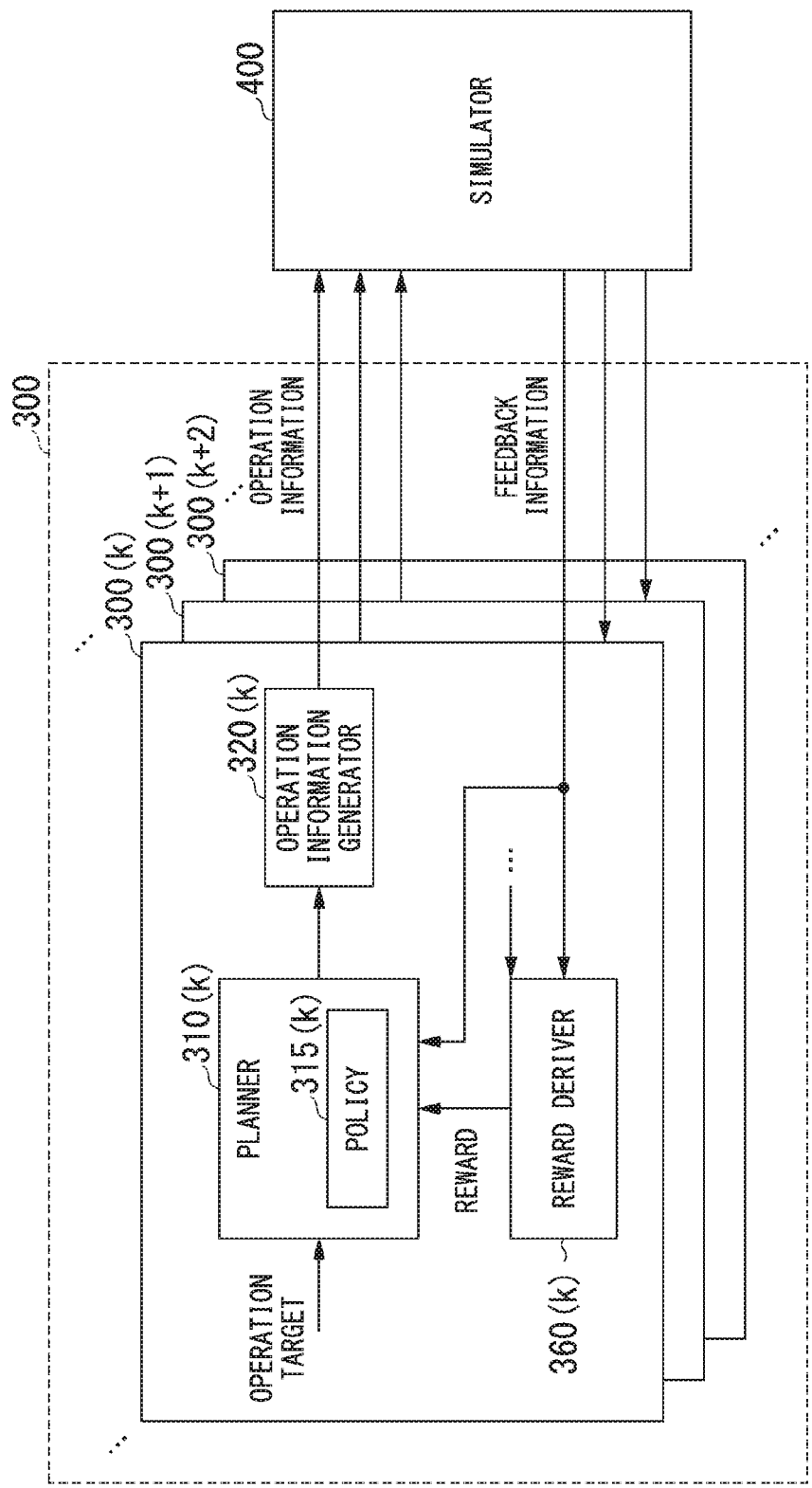
FIG. 4 is a constitution diagram of the learning device.

FIG. 4 is a constitution diagram of the learning device 300. The learning device 300 includes a plurality of individual learners 300($k$) ($k \in R$; R is a set of traffic participants (operation subjects)). The individual learner 300($k$) is realized, for example, by a hardware processor such as a central processing unit (CPU) executing a program (software). The program may be stored in a storage device (non-transitory storage medium) such as an HDD or a flash memory in advance, or the program may be stored in a detachable storage medium (non-transitory storage medium) such as a DVD or a CD-ROM and may be installed in the storage medium by attachment of the storage medium to the drive device.

The individual learner 300($k$) includes a planner 310($k$), an operation information generator 320($k$), and a reward deriver 360($k$), as main constitution elements. Such constitution elements are realized by a hardware processor such as a central processing unit (CPU) executing a program (software). Some or all of such constitution elements may be realized by hardware (a circuit; including a circuitry) such as a large scale integration (LSI), an application specific integrated circuit (ASIC), a field-programmable gate array (FPGA), or a graphics processing unit (GPU), or may be realized by software and hardware in cooperation.

The planner 310($k$) is provided with an operation target and operation characteristic information. The operation target is a guide of the operation of the traffic participant when performing the reinforcement learning, and includes, for example, information for roughly designating a movement direction. The operation characteristic information is information indicating a character related to the operation of the operation subject to be learned by the individual learner 300($k$). For example, information obtained by digitizing or encoding a character such as a character that relatively permits acceleration and velocity, a character that suppresses acceleration and velocity as much as possible, a character that tolerates even a short distance to an object, and a character that wants to maintain a long distance to an object is given as the operation characteristic information. Various pieces of information that change over time, such as feedback information from the simulator 400 are stored in the planner 310($k$). The planner 310($k$) generates information for defining the operation of a subject targeted by the planner 310($k$). The planner 310($k$) determines a movement target point, for example, after a predetermined time (for example, after 0.1 second) and outputs the movement target point to the operation information generator 320($k$). The planner 310($k$) determines the movement target point on the basis of, for example, a policy 315 and a random number. The policy 315($k$) may be a model using a neural network or the like, or may be a rule-based model. For example, the planner 310($k$) outputs, to a operation information generator 320, a trajectory point obtained by offsetting the movement target point, which is determined on the basis of the input various pieces of information and the policy 315($k$), by a direction and a movement amount according to the random number.

Figure 5:
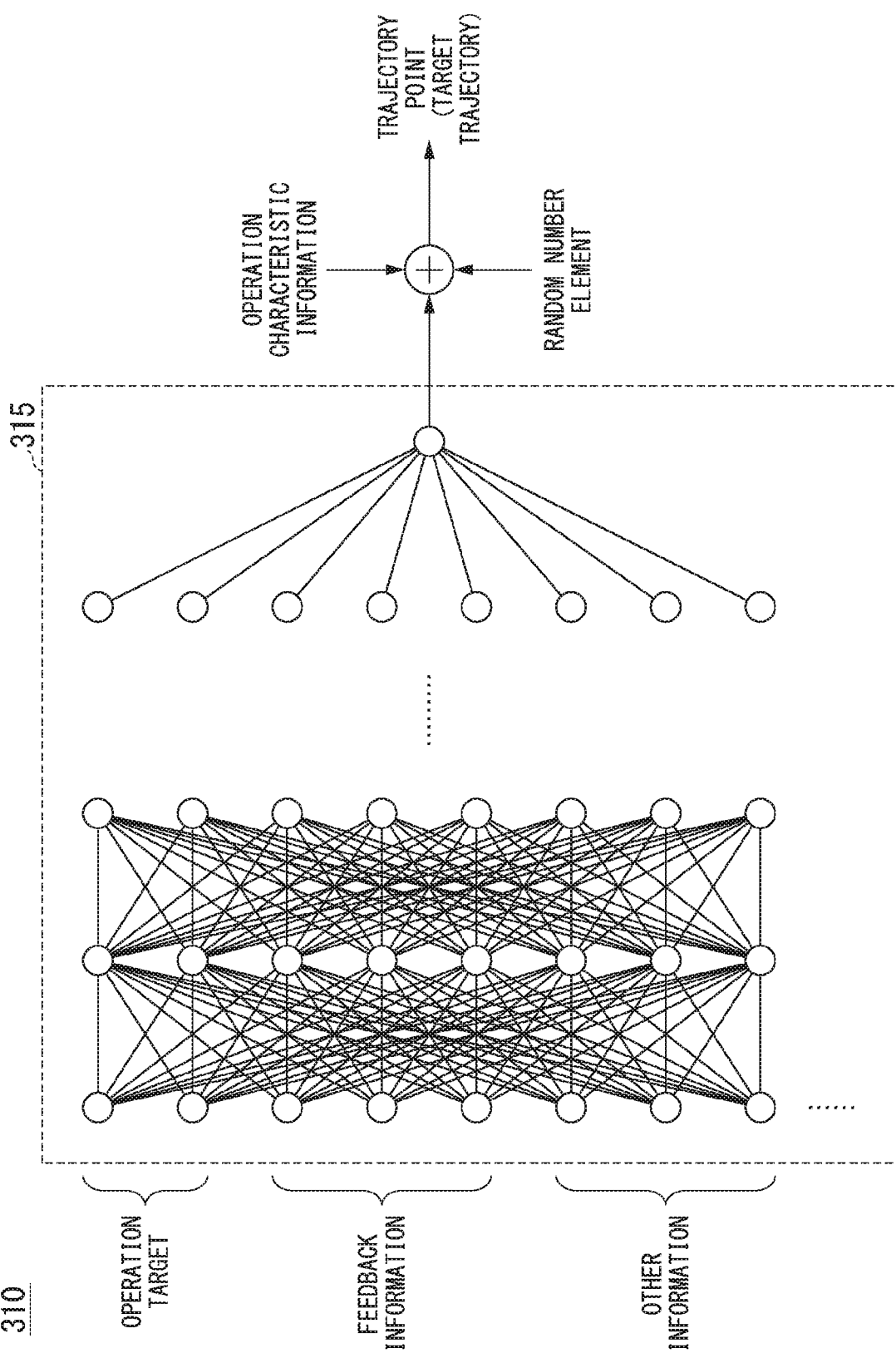
FIG. 5 is a diagram schematically showing a content of a process by a planner.

FIG. 5 is a diagram schematically showing a content of a process by the planner 310($k$). In the shown example, the planner 310($k$) inputs various pieces of information to the neural network and adds the operation characteristic information and a random number element to an output layer to derive the movement target point. In this case, a coefficient or the like of the neural network corresponds to the policy 315($k$). The planner 310($k$) may derive an event in a middle layer of the neural network. The planner 310($k$) may include a rule-based process in the neural network, perform the rule-based process outside the neural network, or may be connected (concatenated) with any layer of the neural network.

The operation information generator 320($k$) generates operation information expressing the operation of the traffic participant for moving to the movement target point, and outputs the generated operation information to the simulator 400. As a case in which the traffic participant is a pedestrian, in a case in which no special control is required to move to the movement target point, the operation information generator 320 may output the movement target point to the simulator 400 as operation information.

The feedback information and information other than the feedback information from the simulator 400 are input to the reward deriver 360($k$). On the basis of the input information (input value), the reward deriver 360($k$) derives a reward on the basis of a rule different for each traffic participant to be learned by the individual learner 300($k$). It is not necessary for all individual learners 300($k$) to derive the reward on the basis of different rules, and some individual learners 300($k$) may derive the reward on the basis of the same rules. The "rule different for each traffic participant" may mean at least "a rule different according to a type of the traffic participant", and may further mean that "a rule related to the reward driving is different even for traffic participants of the same type". This will be described later. The reward derived by the reward deriver 360 is output to the planner 310($k$). The planner 310($k$) applies the reward to a reinforcement learning algorithm such as A3C, and updates the policy 315($k$). Therefore, a preferable generation rule of a suitable movement target point is learned.

[Learning Targeting Vehicle]

Figure 6:
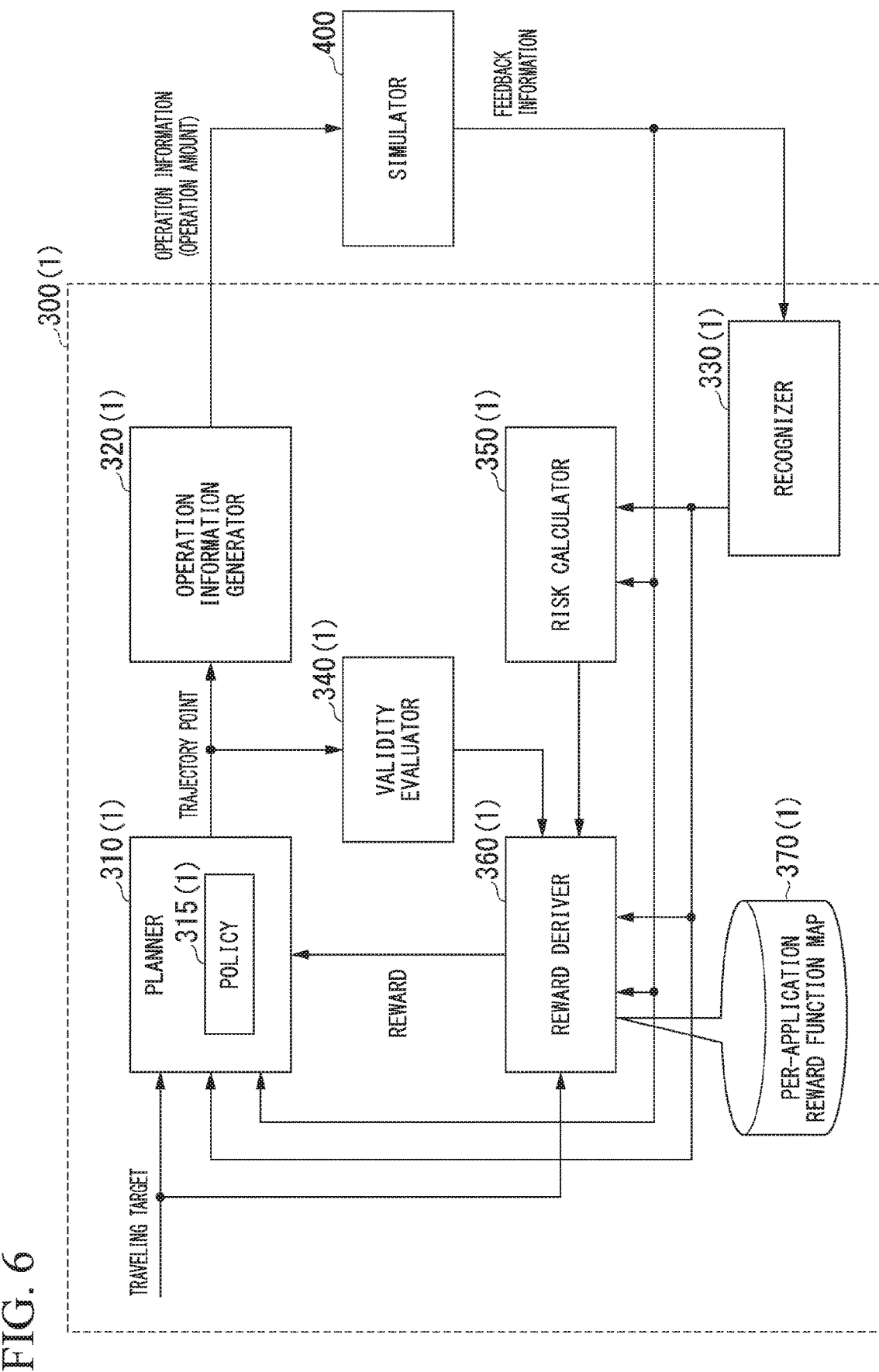
FIG. 6 is a constitution diagram of an individual learner.

Hereinafter, a function of the individual learner 300($k$) will be described in more detail. FIG. 6 is a constitution diagram of the individual learner 300(1) assuming an automated driving vehicle such as the vehicle 1. A per-application reward function map 370(1) is stored in a storage device of the individual learner 300(1). The individual learner 300(1) includes, for example, a planner 310(1), an operation information generator 320(1), a recognizer 330(1), a validity evaluator 340(1), and a risk calculator 350(1), and a reward deriver 360(1).

It is assumed that the same map information is shared by each unit in performing a process described below by the individual learner 300(1). The shared map information is, for example, map information the same as the second map information 62. The calculation of the reward is not performed once at the end, but while the vehicle virtually or actually travels, the reward is repeatedly calculated and calculation results are summed. For example, the learning device 300 performs the learning for each event of the automated driving.

The planner 310(1) is provided with a traveling target (an example of an operation target). The traveling target is a guide of traveling of the vehicle when performing the reinforcement learning, and includes, for example, a speed target value, a route to at least a partial destination, and the like. A sensor detection result from the simulator 400, a recognition result by the recognizer 330, and the like are input to the planner 310(1). The sensor detection result includes at least a detection value of the vehicle sensor 40, and may include a detection result of the camera 10, the radar device 12, the finder 14, or the object recognition device 16. The recognizer 330(1) has the same function as the recognizer 130 in the vehicle 1, and outputs information on a surrounding object in the simulation environment to the planner 310.

The planner 310(1) generates a target trajectory including a plurality of trajectory points. A trajectory point (an example of a movement target point) after a predetermined time (for example, after 0.1 second) among the trajectory points is input to the operation information generator 320(1). The present invention is not limited thereto, and a plurality of trajectory points may be input to the operation information generator 320.

The operation information generator 320(1) has a function the same as the second controller in the vehicle 1, and outputs an operation amount for the traveling driving force output device 200, the brake device 210, or the steering device 220 to the simulator 400.

The validity evaluator 340(1) evaluates validity of the movement (action) of the vehicle to the trajectory point, and outputs an evaluation result to the reward deriver 360(1). The validity evaluator 340(1) evaluates the validity of the action on the basis of, for example, a reference related to ride quality of the occupant of the vehicle, a reference related to a movement possibility, and the like. The reference related to ride quality of the occupant of the vehicle is, for example, a reference in which the validity is evaluated high as an absolute value of acceleration or jerk is small. The reference related to the movement possibility is, for example, a reference in which the validity is evaluated high in a case in which the speed, acceleration, or the like required for the vehicle to move to the trajectory point is within a specified range and the validity is evaluated low in a case in which the speed, acceleration, or the like required for the vehicle to move to the trajectory point is out of the specified range. The validity evaluator 340(1) may change the reference of the validity according to a state of the vehicle and a surrounding environment. For example, in a case in which an obstacle exists in the vicinity of the vehicle, even in a case in which rapid acceleration for avoiding the obstacle is performed, a low value may not be given to the validity.

The risk calculator 350(1) calculates a risk due to the operation on the basis of the sensor detection result, and outputs the calculated risk to the reward deriver 360(1). The risk calculator 350(1) calculates the risk high, for example, in a case in which a distance between the vehicle and the surrounding object is short.

For example, the speed, the acceleration, the lateral position, and the inter-vehicle distance of the vehicle are input from the simulator 400 or the recognizer 330(1) to the reward deriver 360(1), the validity evaluation value is input from the validity evaluator 340(1) to the reward deriver 360(1), and the risk is input from the risk calculator 350(1) to the reward deriver 360(1). The lateral position is a position related to a width direction of the road. Such pieces of information are examples of the information to be evaluated. The speed, the acceleration, the lateral position, and the inter-vehicle distance of the vehicle are examples of the feedback information. The reward deriver 360(1) derives a reward (individual reward) for the operation by applying a reward function based on the per-application reward function map 370(1) to the input information (input value). The individual reward is derived, for example, between zero and 1 (an example of a predetermined value).

The per-application reward function map 370(1) includes a plurality of reward function maps having different evaluation characteristics for a target. FIGS. 7 to 12 are diagrams illustrating each of the reward function maps included in the per-application reward function map 370(1).

Figure 7:
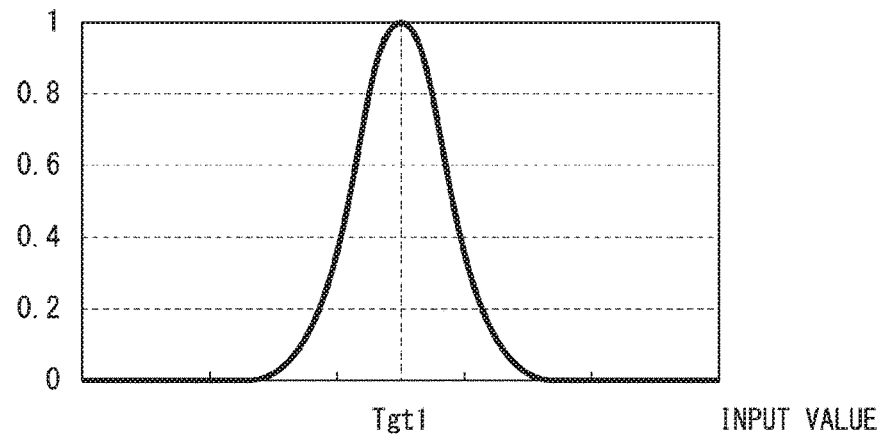
FIG. 7 is a diagram illustrating each of reward function maps included in a per-application reward function map.

A first reward function map shown in FIG. 7 defines a first reward function for returning 1 (an example of a predetermined value) in a case in which the input value matches a target value Tgt1 and returning a smaller value as an absolute value of a difference between the input value and the target value Tgt1 increases. The evaluation characteristic of the first reward function is set, for example, on the basis of a Gaussian function. The first reward function is applied to an input value that is as close as possible to the target value Tgt1. For example, the reward deriver 360(1) derives the individual reward by inputting the speed of the vehicle on the road on which the lowest speed is provided, such as an expressway, to the first reward function.

Figure 8:
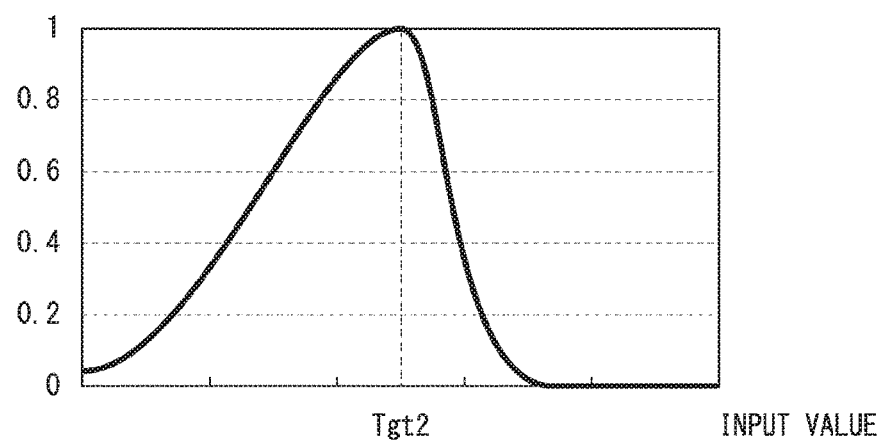
FIG. 8 is a diagram illustrating each of the reward function maps included in the per-application reward function map.

A second reward function map shown in FIG. 8 returns 1 (an example of a predetermined value) in a case in which the input value matches a target value Tgt2, and returns a smaller value as an absolute value of a difference between the input value and the target value Tgt2 increases. However, a degree to which the individual reward for the difference between the input value on a side where the input value exceeds the target value Tgt2 and the target value Tgt2 is reduced is greater than a degree to which the individual reward for the difference between the input value on a side where the input value is less than the target value Tgt2 and the target value Tgt2 is reduced. The evaluation characteristic of the second reward function is set on the basis of, for example, a distribution obtained by applying skew to a distribution such as a Gaussian function. The second reward function is applied to an input value that is desired to be as close as possible to the target value Tgt2 and that does not exceed the target value Tgt2. For example, the reward deriver 360(1) derives the individual reward by inputting the speed of the vehicle to the second reward function.

Figure 9:
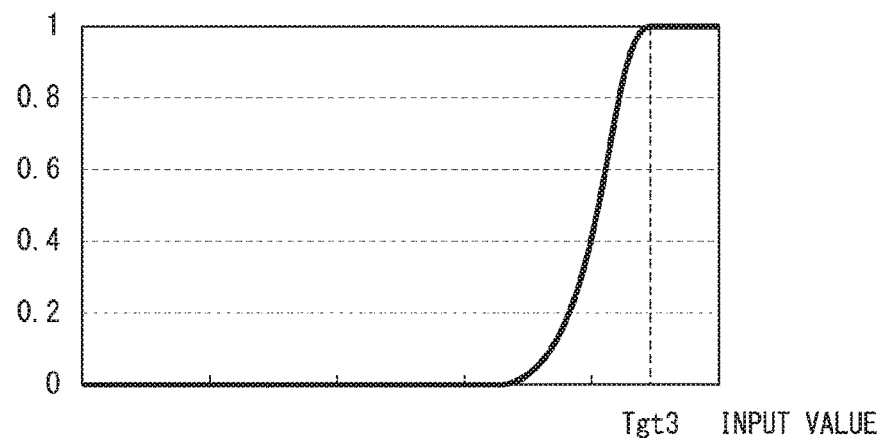
FIG. 9 is a diagram illustrating each of the reward function maps included in the per-application reward function map.

A third reward function map shown in FIG. 9 defines a third reward function for returning 1 (an example of a predetermined value) in a case in which the input value is equal to or greater than a target value Tgt3 and returning a smaller value as an absolute value of a difference between the input value and the target value Tgt3 increases in a case in which the input value is less than the target value Tgt3. The third reward function is applied to an input value that is desired to be maintained as a value equal to or greater than the target value Tgt3. For example, the reward deriver 360(1) derives the individual reward by inputting the inter-vehicle distance to the third reward function.

Figure 10:
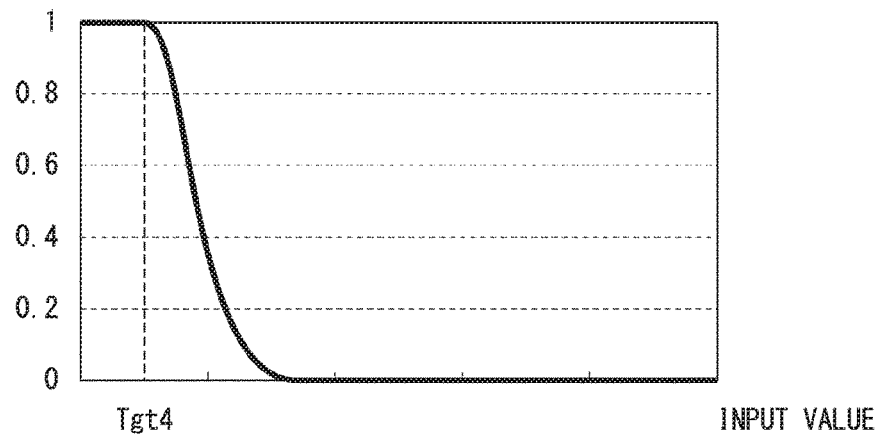
FIG. 10 is a diagram illustrating each of the reward function maps included in the per-application reward function map.

A fourth reward function map shown in FIG. 10 defines a fourth reward function for returning 1 (an example of a predetermined value) in a case in which the input value is equal to or less than a target value Tgt4 and returning a smaller value as an absolute value of a difference between the input value and the target value Tgt4 increases in a case in which the input value is greater than the target value Tgt4. The fourth reward function is applied to an input value that is desired to be maintained as a value equal to or less than the target value Tgt4. For example, the reward deriver 360(1) derives the individual reward by inputting the risk to the fourth reward function.

Figure 11:
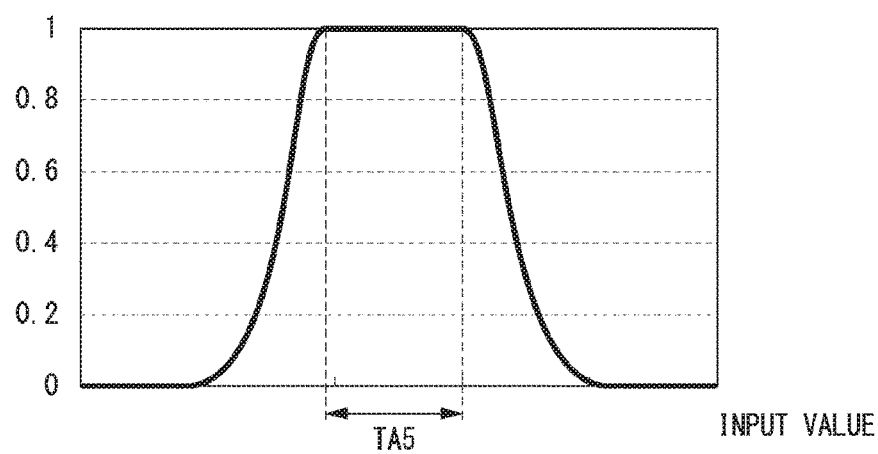
FIG. 11 is a diagram illustrating each of the reward function maps included in the per-application reward function map.

A fifth reward function map shown in FIG. 11 defines a fifth reward function for returning 1 (an example of a predetermined value) in a case in which the input value is within a target range TA5 and returning a smaller value as an absolute value of a difference between the input value and an upper limit or a lower limit of a target range TA5 increases (as a value deviates from the target range TA5). The fifth reward function is applied to an input value that is desired to be within the target range TA5. For example, the reward deriver 360(1) derives the individual reward by inputting the acceleration or the lateral position to the fifth reward function. When the fifth reward function is applied to the acceleration, the target range TA5 includes zero.

Figure 12:
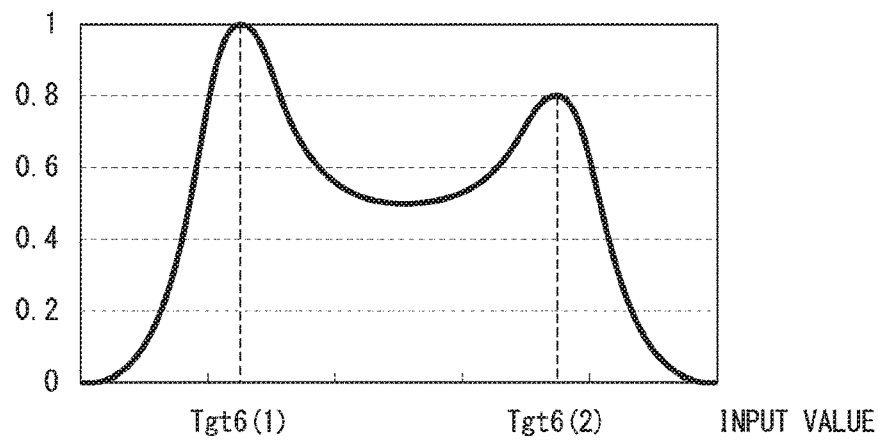
FIG. 12 is a diagram illustrating each of the reward function maps included in the per-application reward function map.

A sixth reward function map shown in FIG. 12 defines a sixth reward function for returning a larger value as the input value approaches any one of two or more target values (two target values Tgt6(1) and Tgt6(2) in the figure). The sixth reward function is applied to an input value that is to be brought closer to any one of a plurality of target values. In the example of FIG. 10, in a case in which the input value matches the target value Tgt6(1), a value larger than a case in which the input value matches the target value Tgt6(2) is returned, but the same value may be returned. For example, the reward deriver 360(1) derives the individual reward by inputting the lateral position to the sixth reward function. In this case, the target value Tgt6(1) and the target value Tgt6(2) are a center of two travelable adjacent lanes. For example, in a case in which the vehicle travels the target value Tgt6(1) corresponding to a center of the traveling lane, the individual reward is derived higher than in a case in which the vehicle travels the target value Tgt6(2) corresponding to a center of an overtaking lane.

The reward deriver 360(1) calculates a total reward by, for example, multiplying a plurality of individual rewards obtained on the basis of a plurality of input values by each other. In the example described above, the reward deriver 360(1) calculates the total reward on the basis of Formula (1). F1 to F6 correspond to the first to sixth reward functions, respectively. The reward deriver 360(1) may calculate the total reward by obtaining a weighted sum of the individual rewards instead of multiplying the individual rewards.

$$\text{Reward (total)} = F1(\text{speed}) \text{ or } F2(\text{speed}) \times F3(\text{inter-vehicle distance}) \times F4(\text{risk}) \times F5(\text{acceleration}) \times F6(\text{horizontal position}) \quad (1)$$

While the vehicle virtually travels, the total reward for the action generated by the planner 310(1) is derived repeatedly, and in a case in which one traveling is ended, an accumulated reward obtained by summing the total reward in a time direction is calculated. In addition, the planner 310(1) applies the accumulated reward to a reinforcement learning algorithm such as A3C, and updates the policy 315(1). Therefore, a generation rule of a preferable trajectory point is learned.

Figure 13:
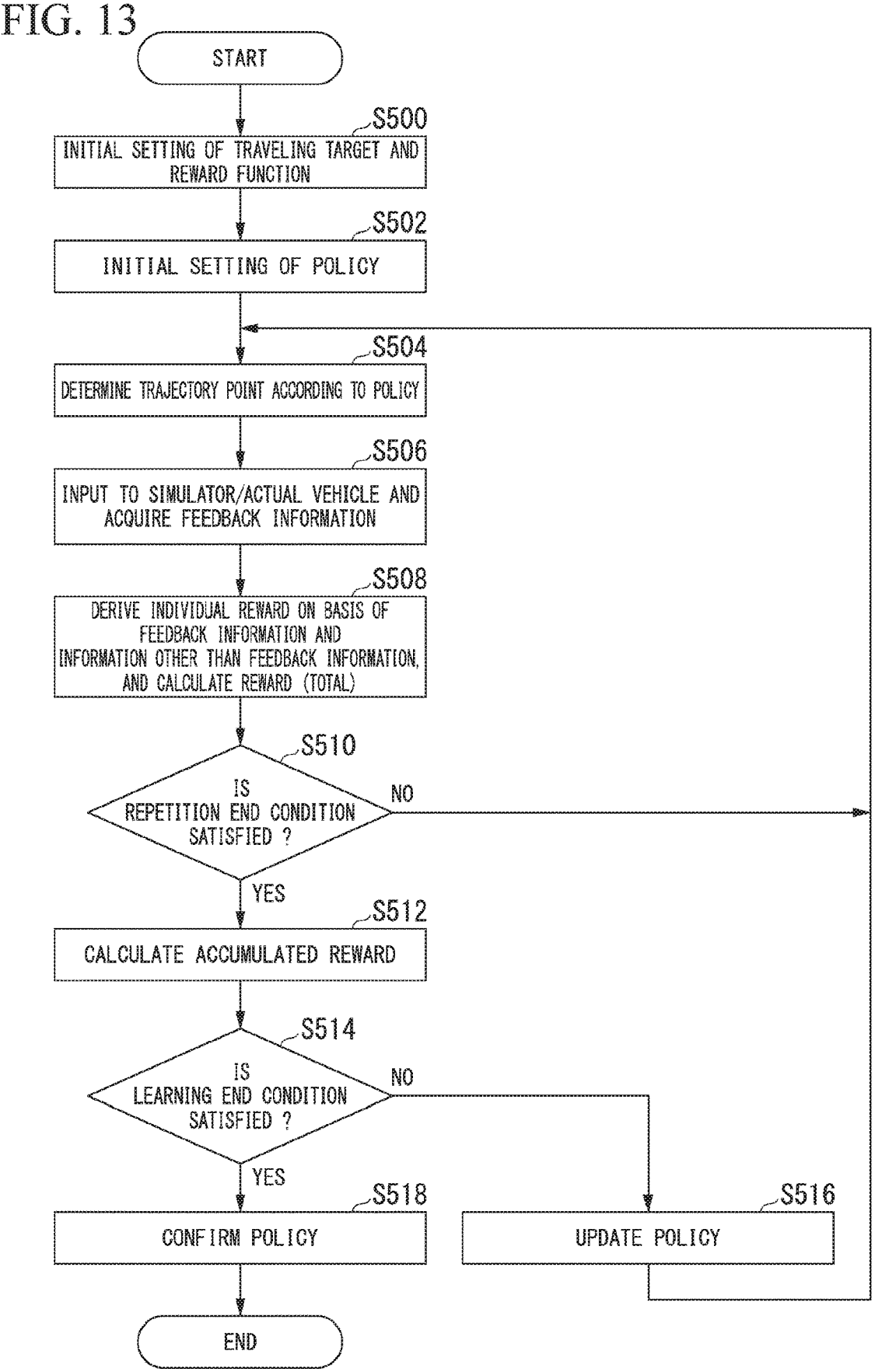
FIG. 13 is a flowchart showing an example of a flow of a process executed by the learning device.

FIG. 13 is a flowchart showing an example of a flow of a process executed by the individual learner 300(1). First, the individual learner 300(1) performs an initial setting of the traveling target and the reward function (step S500), and then performs an initial setting of the policy 315 (step S502).

Next, the planner 310(1) determines the trajectory point according to the policy 315(1) (step S504). The individual learner 300(1) inputs the various pieces of information to the simulator 400 through the process of the operation information generator 320(1), and acquires the feedback information (step S506).

Next, the reward deriver 360(1) derives the individual reward on the basis of the feedback information and the information other than the feedback information, and further calculates the total reward (step S508). In addition, the individual learner 300(1) determines whether or not a repetition end condition is satisfied (step S510). The repetition end condition is, for example, that the number of trajectory points determined in step S504 has reached a predetermined number. In a case in which the repetition end condition is not satisfied, the process returns to step S504.

In a case in which the repetition end condition is satisfied, the reward deriver 360(1) calculates the accumulated reward (step S512). Next, the individual learner 300(1) determines whether or not a learning end condition is satisfied (step S514). The learning end condition is, for example, that the accumulated reward calculated in step S512 is equal to or greater than a threshold value.

In a case in which the learning end condition is not satisfied, the planner 310(1) updates the policy 315(1) on the basis of the reinforcement learning algorithm (step S516), and returns the process to step S504. In a case in which the learning end condition is satisfied, the individual learner 300(1) confirms the policy 315(1) (step S518).

[Learning Related to Other Traffic Participants]

Hereinafter, the above-described "rules different for each traffic participant" will be described again. The rules different for each traffic participant are realized, for example, by a difference of the reward function. For each traffic participant, a part of the reward function may be added or omitted.

For example, in a case in which the traffic participant is a pedestrian, since a penalty for "acceleration" may be smaller than that of the vehicle, the difference of the reward function is realized so that a map that is flatter than the fifth reward function map shown in FIG. 11 is used. The reward for the "inter-vehicle distance" may be omitted because a meaning is small originally. For the "lateral position", since it is preferable to set a position corresponding to a sidewalk to the lateral position, a map obtained by shifting a peak value of the sixth reward function map shown in FIG. 12 to both end sides may be used. In a scene where the pedestrian crosses a crosswalk, the reward related to the "lateral position" may be temporarily fixed.

Even for the same traffic participant, the reward function may be switched on the basis of the information corresponding to the operation characteristic information given to the planner 310(k). For example, the reward function may be different between "a vehicle driven by a driver who desires sporty driving" and a "vehicle driven by a safety-oriented driver". In this case, related to the fifth reward function map shown in FIG. 11, a map that is flatter than the latter may be used for the former.

As described above, by making the reward function different for each traffic participant, it is possible to simultaneously generate an action determination model and a diverse simulation environment. As a result, the learning is able to be performed in a simulation environment closer to a real space.

According to the embodiment described above, the learning is able to be performed in the simulation environment closer to the real space.

Figure 14:
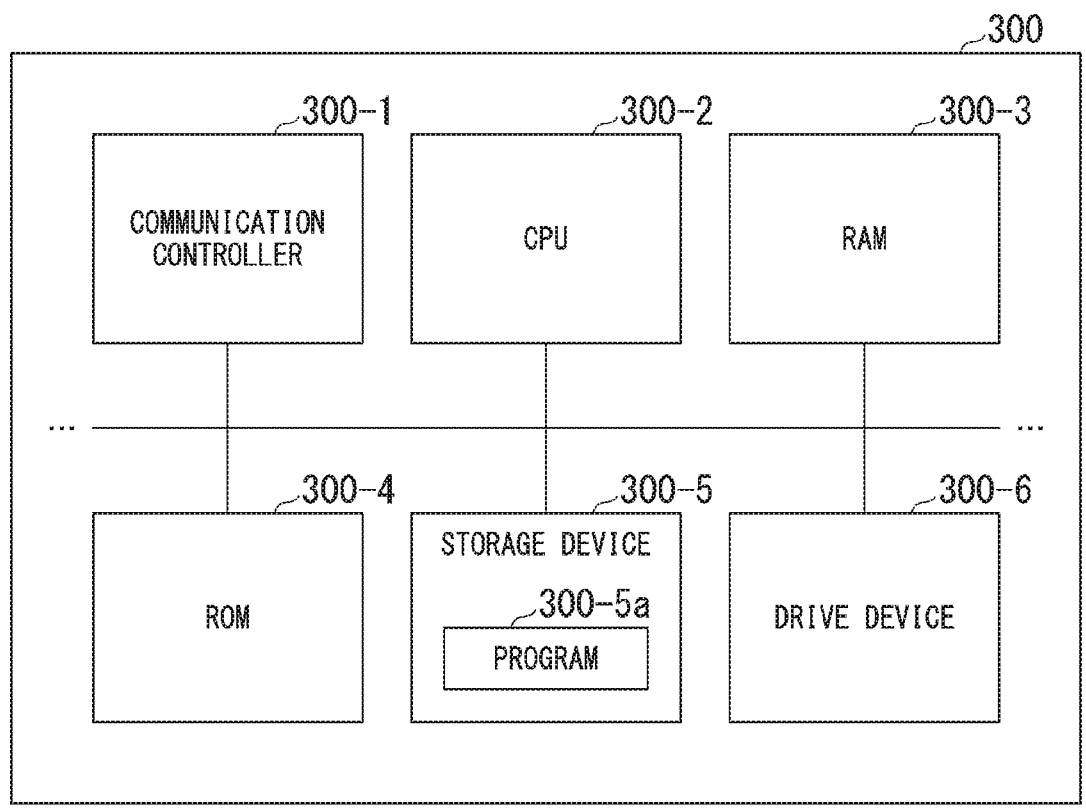
FIG. 14 is a diagram showing an example of a hardware constitution of the learning device.

The learning device 300 and the simulator 400 are realized by the following hardware. FIG. 14 is a diagram showing an example of a hardware constitution of the learning device 300 (or the simulator 400). As shown in the figure, the learning device 300 includes a communication controller 300-1, a CPU 300-2, a random access memory (RAM) 300-3 used as a working memory, and a read only memory (ROM) 300-4 storing a boot program and the like, a storage device 300-5 such as a flash memory or a hard disk drive (HDD), a drive device 300-6, and the like, which are mutually connected by an internal bus or a dedicated communication line. The communication controller 300-1 communicates with other devices. The storage device 300-5 stores a program 300-5a executed by the CPU 300-2. The program is developed to the RAM 300-3 by a direct memory access (DMA) controller (not shown) or the like and executed by the CPU 300-2. Therefore, a part or all of the individual learner 300(k) and an internal constitution thereof are realized. The function of the simulator 400 is also realized similarly.

The embodiment described above is able to be expressed as follows.

A learning device including a storage device that stores a program and a hardware process,
wherein the hardware processor executes the program to function as a plurality of individual learners,
each of the individual learners configured to:
generate information for defining an operation of an operation subject corresponding to itself;
derive a reward obtained by evaluating information to be evaluated including feedback information obtained from a simulator by inputting information based on the information for defining the operation of the operation subject to the simulator; and
perform reinforcement learning based on the derived reward, and
at least two of the plurality of individual learners are different in the operations in which the reward is maximized.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A learning device for a vehicle simulation comprising a plurality of individual learners each associated with an operation subject,
wherein each of the individual learners comprises a processor configured to:
generate information for defining an operation of the operation subject corresponding to itself; and
derive a reward obtained by evaluating information to be evaluated including feedback information obtained from a simulator by inputting information based on the information for defining the operation of the operation subject to the simulator,
wherein each of the processors derives the reward by inputting an input value to a reward function map, the input value being a speed of the operation subject, acceleration of the operation subject, or an index value that represents a peripheral environment of the operation subject,
wherein the processor performs reinforcement learning based on the reward derived, and
wherein at least two of the plurality of individual learners are different in the reward function map used by the processor.

2. The learning device according to claim 1,
wherein at least two of the plurality of individual learners are different in operation characteristics of the operation subject that becomes a premise that the processor generates the information.

3. A simulation system comprising:
the learning device according to claim 1; and
the simulator according to claim 1.

4. A learning method of causing a computer, for a vehicle simulation, to function as a plurality of individual learners each associated with an operation subject,
wherein each of the individual learners is configured to:
generate information for defining an operation of the operation subject corresponding to itself;
derive a reward obtained by evaluating information to be evaluated including feedback information obtained from a simulator by inputting information based on the information for defining the operation of the operation subject to the simulator, wherein to derive the reward an input value is input to a reward function map, the input value being a speed of the operation subject, acceleration of the operation subject, or an index value that represents a peripheral environment of the operation subject; and
perform reinforcement learning based on the derived reward, and
at least two of the plurality of individual learners are different in the reward function map used to derive the reward.

5. A computer-readable non-transitory storage medium storing a program that, for a vehicle simulation, causes a computer to function as a plurality of individual learners each associated with an operation subject,
wherein each of the individual learners is configured to:
generate information for defining an operation of the operation subject corresponding to itself;
derive a reward obtained by evaluating information to be evaluated including feedback information obtained from a simulator by inputting information based on the information for defining the operation of the operation subject to the simulator, wherein to derive the reward an input value is input to a reward function map, the input value being a speed of the operation subject, acceleration of the operation subject, or an index value that represents a peripheral environment of the operation subject; and
perform reinforcement learning based on the derived reward, and
at least two of the plurality of individual learners are different in the reward function map used to derive the reward.

* * * * *